March 4, 1930.    W. S. MILLER    1,749,498
DAMPER
Filed June 10, 1929    2 Sheets-Sheet 1

Willoughby S. Miller, Inventor
By C A Snow & Co.
Attorneys.

March 4, 1930. W. S. MILLER 1,749,498
DAMPER
Filed June 10, 1927 2 Sheets-Sheet 2

Willoughby S. Miller, Inventor
By C. A. Snow & Co.
Attorneys.

Patented Mar. 4, 1930

1,749,498

UNITED STATES PATENT OFFICE

WILLOUGHBY S. MILLER, OF READING, PENNSYLVANIA

DAMPER

Application filed June 10, 1929. Serial No. 369,793.

The device forming the subject matter of this application is an improvement on the device shown in my prior Patent No. 1,105,366, issued on July 28, 1914.

Some users have claimed that the structure shown in my patent above-mentioned is not so useful as it might be, for two reasons, one of which is that if it is located close to the stove, the door cannot be closed always, another objection being that the stove pipe will not always stay in place.

The aforesaid objections I aim to obviate in the device forming the subject matter of this application.

It is within the province of the disclosure to improve generally and to enhance the utility of devices of that sort to which the invention appertains.

With the above and other objects in view, which will appear as the description proceeds, the invention resides in the combination and arrangment of parts and in the details of construction hereinafter described and claimed, it being understood that changes may be made in the precise embodiment of the invention herein disclosed, within the scope of what is claimed, without departing from the spirit of the invention.

Figure 1:
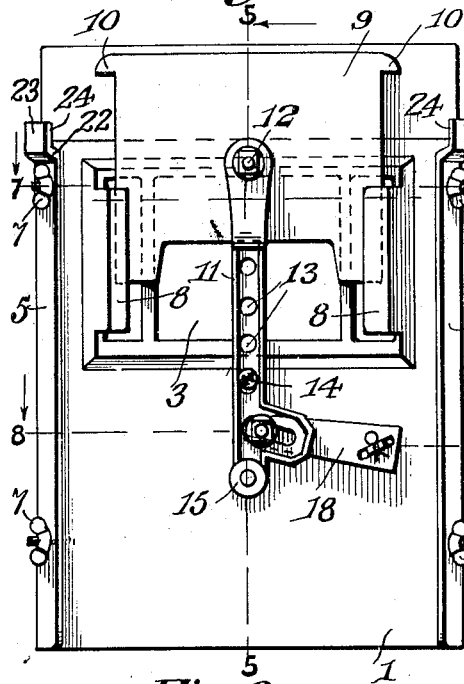
Figure 1 shows in side elevation a device forming the subject matter of this application.
Figure 2:
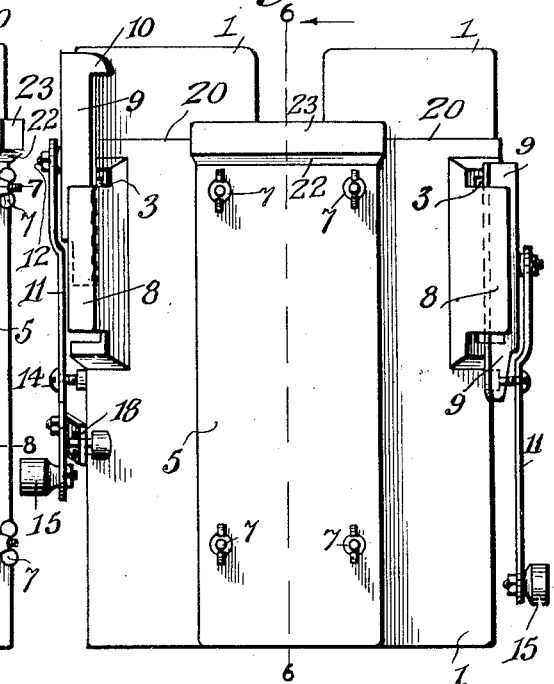
Figure 2 is an elevation wherein the mechanism is viewed at right angles to the showing of Figure 1.
Figure 3:
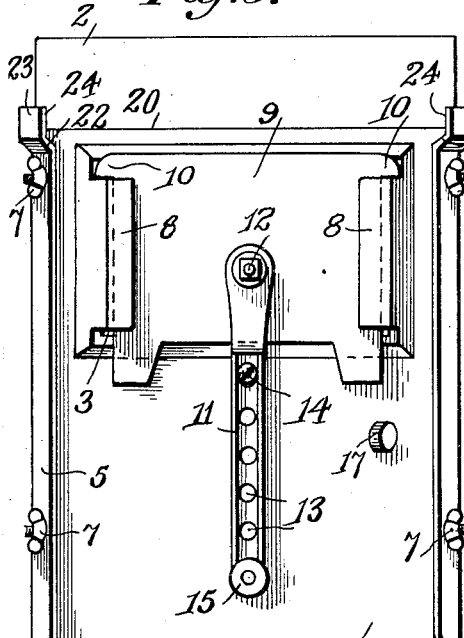
Figure 3 is an elevation showing the opposite side of the device from that depicted in Figure 1.

In carrying out my invention I provide a cylinder which is formed in two sections 1 and 2 and each of these sections has an opening in the side thereof as indicated at 3. Slots 4 are formed in the edges of each of the sections 1 and 2 and plates 5 overlap the edges of the two sections. Threaded bolts 6 extend through the slots 4, and thumb nuts 7 are screwed onto the threaded ends of the bolts. By this arrangement the cylinder may be expanded to fit pipes of various sizes.

Formed on each side of the openings 3 are guides 8 in which operate sliding doors 9 which are provided with projections 10 at the top to limit the downward movement of the doors. Arms 11 are pivotally connected to the doors at 12, and these arms are provided with openings 13 which are adapted to receive a projection 14 formed on the section of the cylinder. Handles 15 are provided on the lower end of each of the arms 11.

Figure 4:
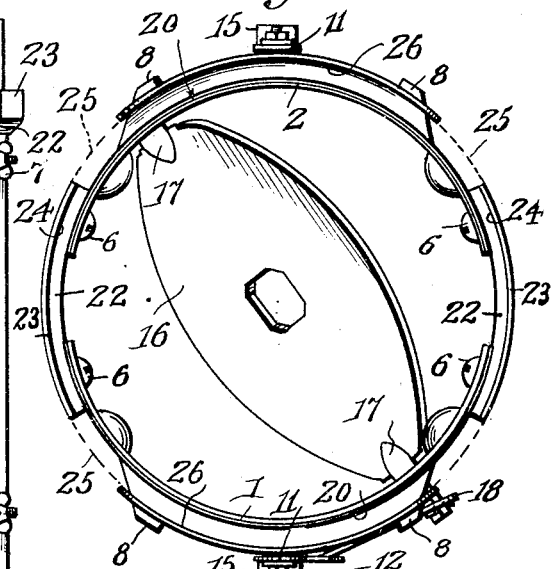
Figure 4 is a top plan.

A damper plate 16 is pivotally mounted within the cylinder and as clearly shown in Figure 4 is of slightly less diameter than the cylinder. This plate 16 is pivoted by means of lugs 17 which enter openings formed in the sections of the cylinder. On the end of one of these lugs 17 is secured a crank arm 18 which is also attached to one of the arms 11.

It will be seen that by grasping the handle 15 on the arm 11, the arm may be disengaged from the projection 14 formed on the cylinder, and the sliding door can then be regulated. It will be seen that when operating the sliding door to which the arm 18 is connected, the damper 16 will be turned in various positions thereby cutting off the draft through the pipe. By this arrangement I am enabled to secure the proper draft through the pipe at all times. It will be also noted that by this construction the two sliding doors are independently operated and one of the doors may be opened or closed without in any way affecting the position of the damper 16 within the cylinder. It will also be readily apparent that by having the cyliner formed in the two sections it can be adjusted to receive the ends of stove pipes of various sizes.

The foregoing description is copied substantially verbatim from my aforesaid Patent 1,105,366, and referring to some of the features which characterize the present invention, it may be stated that the device shown in the patent referred to cannot always be operated successfully, because if it happens to be located immediately on top of the stove, the lower end of one of the arms 11 will hit the top of the stove before the corresponding door 9 closes. This objection is done away within the present invention, because the tubular member 1—2—5 projects downwardly further than the lower end of the arm 11 of Figure 1, when the corresponding door is fully closed.

Figure 5:
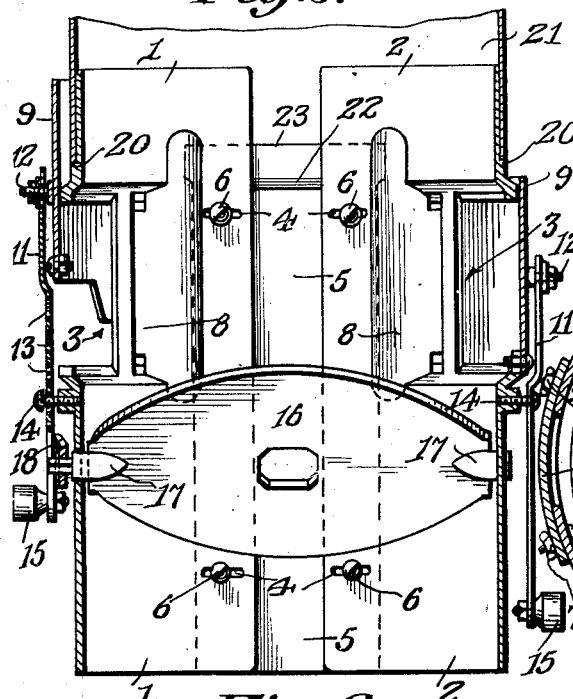
Figure 5 is a longitudinal section on the line 5—5 of Figure 1.
Figure 7:
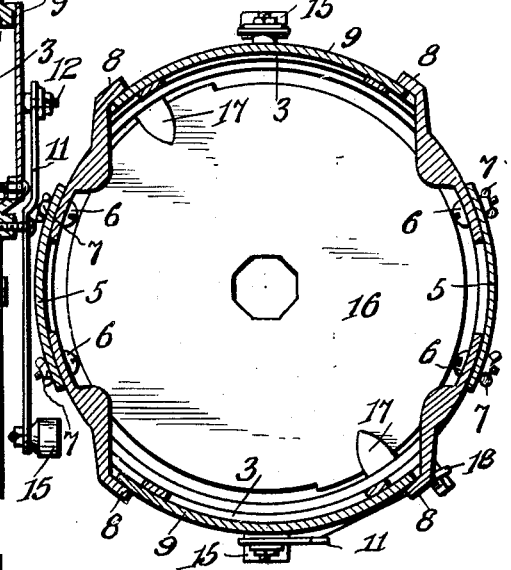
Figure 7 is a cross section on the line 7—7 of Figure 1.
Figure 6:
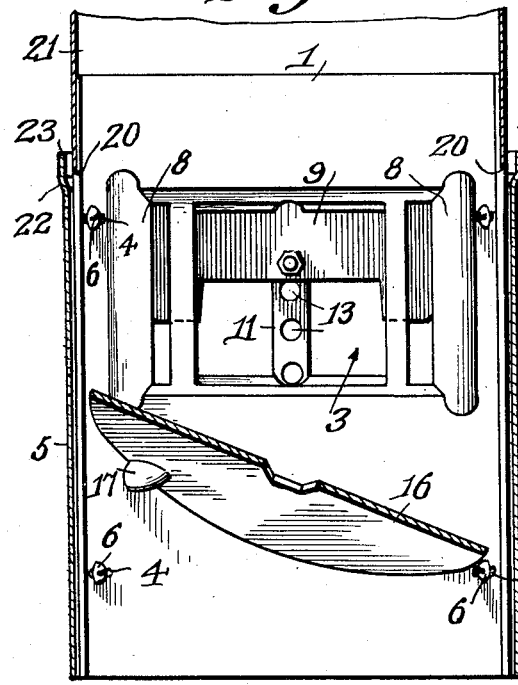
Figure 6 is a longitudinal section on the line 6—6 of Figure 2.
Figure 8:
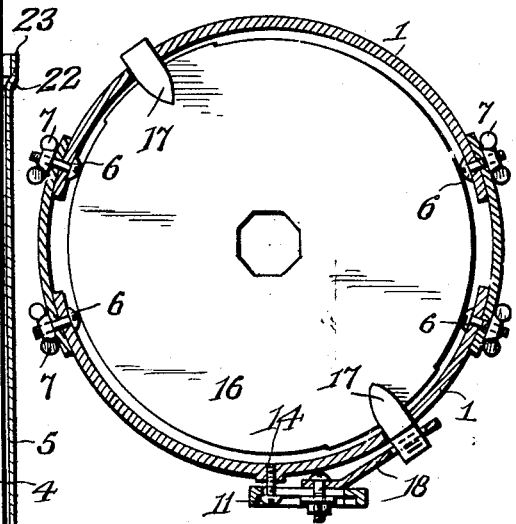
Figure 8 is a cross section on the line 8—8 of Figure 1.

It has been stated by some that the stove pipe occasionally interferes with the raising of the doors in the patented device hereinbefore referred to, and in the present invention, the stove pipe cannot interfere with the raising of the doors. Referring to Figure 5, for instance, it will be seen that the sections 1 and 2 of the tubular member are provided with external shoulders 20 on which a stove pipe 21 rests. The upper ends of the extension plates 5 are offset as at 22 to form curved upstanding retaining wings 23, the inner surfaces 24 of which are located within the circle 25 that coincides with the inner surfaces 26 of the doors 9. Thus, even though the stove pipe 21 should happen to slip off the shoulder 20, the wings 23 will hold in the stove pipe enough so that it cannot bulge outwardly, get above the doors 9, and prevent the doors from opening.

I claim:—

In a device of the class described, a tubular member comprising sections, each section having an opening, doors slidable longitudinally of the sections and controlling the openings, extension plates overlapping on the longitudinal edges of the sections, means for connecting the extension plates adjustably to the sections, a pipe-receiving shoulder on the sections, and the upper ends of the extension plates being outwardly offset to form wings extended upwardly higher than the shoulder, the inner surfaces of the wings lying inwardly of a circle coinciding with the inner surfaces of the doors, thereby to prevent a pipe from interfering with the raising of the doors, should the pipe be dislodged from the shoulder.

In testimony that I claim the foregoing as my own, I have hereto affixed my signature.

WILLOUGHBY S. MILLER.